United States Patent [19]
Kim et al.

[11] Patent Number: 6,044,176
[45] Date of Patent: Mar. 28, 2000

[54] METHOD OF PERFORMING INVERSE DISCRETE COSINE TRANSFORM

[75] Inventors: Hye-Jeong Kim, Ch'ang-won; Jaemin Kim, Seoul, both of Rep. of Korea

[73] Assignee: Samsung Electronics Co., Ltd., Kyungki-do, Rep. of Korea

[21] Appl. No.: 08/744,147

[22] Filed: Nov. 12, 1996

[51] Int. Cl.$^7$ ................................................. G06T 9/00
[52] U.S. Cl. ................................... 382/233; 382/250
[58] Field of Search .................................. 382/233, 234, 382/250, 277–281

[56] References Cited

U.S. PATENT DOCUMENTS

| | | | |
|---|---|---|---|
| 4,791,598 | 12/1988 | Liou et al. | 708/402 |
| 5,668,748 | 9/1997 | Huang | 382/250 |
| 5,854,757 | 5/1996 | Dierke | 382/250 |
| 5,867,601 | 10/1995 | Phillips | 382/250 |

OTHER PUBLICATIONS

Chan et al., "A New Two–Dimensional Fast Cosine Transform Algorithm", IEEE Transactions on Signal Processing, vol. 39, No. 2, pp. 481–485, Feb. 1991.

Grissom, et al. "An Algorithm for a Fast Two–Dimensional Discrete Cosine Transform", pp. 646–651, Mar. 1990.

*Primary Examiner*—Amelia Au
*Assistant Examiner*—Larry J. Prikockis
*Attorney, Agent, or Firm*—Sughrue, Mion, Zinn, Macpeak & Seas, PLLC

[57] ABSTRACT

A method of performing an inverse discrete cosine transform (IDCT) capable of reducing the amount of calculation while satisfying bit accuracy required by international standards. The IDCT method comprises the steps of defining each column of scalars $X_{ij}$ (where, i,j=0,1,2, ..., N−1) and $Y_{ij}$ as a vector $\dot{X}_i = \{X_{i0}, X_{i1}, \ldots, X_{i(N-1)}\}$ and a vector $\dot{Y}_i = \{Y_{i0}, Y_{i1}, \ldots, Y_{i(N-1)}\}$, respectively, storing values of $$C_{ij}\sqrt{\frac{2}{N}}\,C(i)\cos\left[\frac{(2j+1)\pi i}{2N}\right]\left(C(i)=\frac{1}{\sqrt{2}}(i=0,\ C(i)=1(i\neq 0)\right)$$

in a scalar register, storing values of $\dot{X}_i = \{X_{i0}, X_{i1}, \ldots, X_{i(N-1)}\}$ in a vector register, obtaining $\dot{Y}_i = \{Y_{i0}, Y_{i1}, \ldots, Y_{i(N-1)}\}$ by reading out the values stored in the scalar register and the vector register and by parallel-processing scalar-vector multiplications and vector-vector additions with respect to the readout scalar values and vector values according to the equation $$\dot{Y}_i = \sum_{j=0}^{N-1} X_{ij} \times \dot{X}_j,$$

obtaining values of a one-dimensional IDCT in a first direction by performing the one-dimensional IDCT in the first direction by repeatedly performing the above described steps N times, obtaining a transposed matrix of the obtained one-dimensional IDCT values in the first direction, and obtaining values of a final two-dimensional IDCT by obtaining values of the transposed matrix in the same manner as the one-dimensional IDCT in the first direction and obtaining a transposed matrix of the obtained values to perform a one-dimensional IDCT in a second direction.

4 Claims, 2 Drawing Sheets

METHOD OF PERFORMING INVERSE DISCRETE COSINE TRANSFORM

BACKGROUND OF THE INVENTION

1. Field of the Invention

The present invention relates to a method of producing an inverse discrete cosine transform (IDCT), and more particularly to a method of producing an IDCT capable of reducing the amount of calculation while satisfying the bit accuracy required by international standards.

2. Description of the Prior Art

The discrete cosine transform (DCT) has been widely used as a data compression technique using correlation among pixels of an image. The technique has been adopted for international standards such as MPEG, JPEG, H.261, etc. Accordingly, in a receiving apparatus for receiving image data which is compressed using DCT, the IDCT is required to recover information which was compressed using this technique. Since DCT requires a large amount of multiplication, addition and subtraction, research for high-speed calculation is now in progress.

Various techniques have been utilized to reduce the amount of calculation or time required to perform the IDCT. One technique is taught by J. Yang, "An Efficient Two-Dimensional Inverse Discrete Cosine Transform Algorithm for HDTV Receivers", IEEE Trans. Circuits and Systems for Video Technology, Vol. 5, No. 1, February, 1995. However, the arithmetic operations disclosed by Yang cannot be easily vectorized. As a result, the parallel processing of the operations is difficult, and the amount of calculation is increased.

Another technique is taught by N. Demassieux and F. Jutand, "Orthogonal Transforms in VLSI Implementations for Image Communications", edited by P. Pirsch, Elsevier Science Publisher, The Netherlands, 1993. The Butterfly chain based fast algorithm disclosed by Demassieux and Jutand includes numerous multiplication operations which deteriorate bit accuracy and cause non-compliance with the international standards previously mentioned.

Typically, the IDCT is performed using a floating-point processor because of the cosine values used in the IDCT. In order to achieve high-speed processing, a high-performance processor is required, thereby increasing the cost of the receiving apparatus.

A two-dimensional IDCT is given by
Mathematical Expression 1

$$f(x, y) = \frac{2}{N} \sum_{u=0}^{N-1} \sum_{v=0}^{N-1} C(u)C(v)F(u, v)\cos\left[\frac{(2x+1)\pi}{2N}u\right]\cos\left[\frac{(2y+1)\pi}{2N}v\right]$$

$(x, y+1, 2, \cdots, N-1), C(u),$ $$C(v) = \frac{1}{\sqrt{2}}(u, v = 0), C(u), C(v) = 1(u, v \neq 0)$$

If we define $$C_{ij} = \sqrt{\frac{2}{N}} C(i)\cos\left[\frac{(2j+1)\pi i}{2N}\right] (i, j+1, 2, \cdots, N-1),$$

the mathematical expression 1 can be expressed as the matrix expression which is given by
Mathematical Expression 2
$[f]=[c][F][C]^T$ Here, the transposed matrix $C^T$ corresponds to a one-dimensional IDCT in a vertical direction, and the matrix C corresponds to a one-dimensional IDCT in a horizontal direction. Accordingly, in order to calculate a two-dimensional IDCT, calculation processes in both horizontal and vertical directions should be performed. A general vector processor can perform a parallel process only in one direction. Therefore, the vectorization of the operations in both directions cannot be achieved.

SUMMARY OF THE INVENTION

It is an object of the present invention to solve the problems of the prior art and to provide a method of performing IDCT which can reduce the amount of calculation and satisfy the bit accuracy of international standards.

In one aspect of the present invention, there is provided a method of performing IDCT on compressed image data whereby a one-dimensional IDCT is performed with respect to N×N DCT data $X_{ij}$ using the following expression $$Y_{ij} = \sum_{k=0}^{N-1} C_{ik} \times X_{kj} (\text{where}, i, j = 0, 1, 2, \cdots, N-1),$$

the method comprising the steps of:

defining each row of the scalars $X_{ij}$ as a vector $\dot{X}_i = \{X_{i0}, X_{i1}, \ldots, X_{i(N-1)}\}$ and Yo as a vector $\dot{Y}_i = \{Y_{i0}, Y_{i1}, \ldots, Y_{i(N-1)}\}$, respectively;

storing the scalar values of $$C_{ij} = \sqrt{\frac{2}{N}} C(i)\cos\left[\frac{(2j+1)\pi i}{2N}\right]$$

$$\left(C(i) = \frac{1}{\sqrt{2}}(i=0), C(i) = 1(i \neq 0)\right)$$

obtaining the vector $\dot{Y}_i = \{Y_{i0}, Y_{i1}, \ldots, Y_{i(N-1)}\}$ by reading out the values stored in the scalar register and the vector register and by parallel-processing scalar-vector multiplications and vector-vector additions with respect to the readout scalar values and vector values according to the equation $$\dot{Y}_i = \sum_{j=0}^{N-1} X_{ij} \times \dot{X}_j;$$

In another aspect of the present invention, there is provided a method of performing IDCT on compressed image data comprising the steps of:

defining each column of scalars, $X_{ij}$ (where, i, j=0, 1, 2, ..., N−1) and $Y_{ij}$ as a vector $\dot{X}_i = \{X_{i0}, X_{i1}, \ldots, X_{i(N-1)}\}$ and a vector $\dot{Y}_i = (Y_{i0}, Y_{i1}, \ldots, Y_{i(N-1)}\}$, respectively;

storing values of $$C_{ij} = \sqrt{\frac{2}{N}} C(i)\cos\left[\frac{(2j+1)\pi i}{2N}\right]\left(C(i) = \frac{1}{\sqrt{2}}(i=0), C(i) = 1(i \neq 0)\right)$$

in a scalar register;

storing values of $\dot{X}_i = \{X_{i0}, X_{i1}, X_{i(N-1)}\}$ in a vector register;

obtaining $\dot{Y}_i = (Y_{i0}, Y_{i1}, \ldots, Y_{i(N-1)}\}$ by reading out the values stored in the scalar register and the vector register and by parallel-processing scalar-vector multiplications and vector-vector additions with respect to the readout scalar values and vector values according to the expression $$\dot{Y}_i = \sum_{j=0}^{N-1} C_{ij} \times X_j$$

obtaining values of a one-dimensional IDCT in a first direction by performing the one-dimensional IDCT in the first direction:

obtaining a transposed matrix of the obtained one-dimensional IDCT values in the first direction; and obtaining values of a final two-dimensional IDCT by obtaining values of the transposed matrix in the same manner as the one-dimensional IDCT in the first direction and by obtaining a transposed matrix of the obtained values to perform a one-dimensional IDCT in a second direction.

BRIEF DESCRIPTION OF THE DRAWINGS

The above object, features and advantages of the present invention will become more apparent by describing a preferred embodiment thereof with reference to the accompanying drawings, in which.

DETAILED DESCRIPTION OF PREFERRED EMBODIMENT

Figure 1:
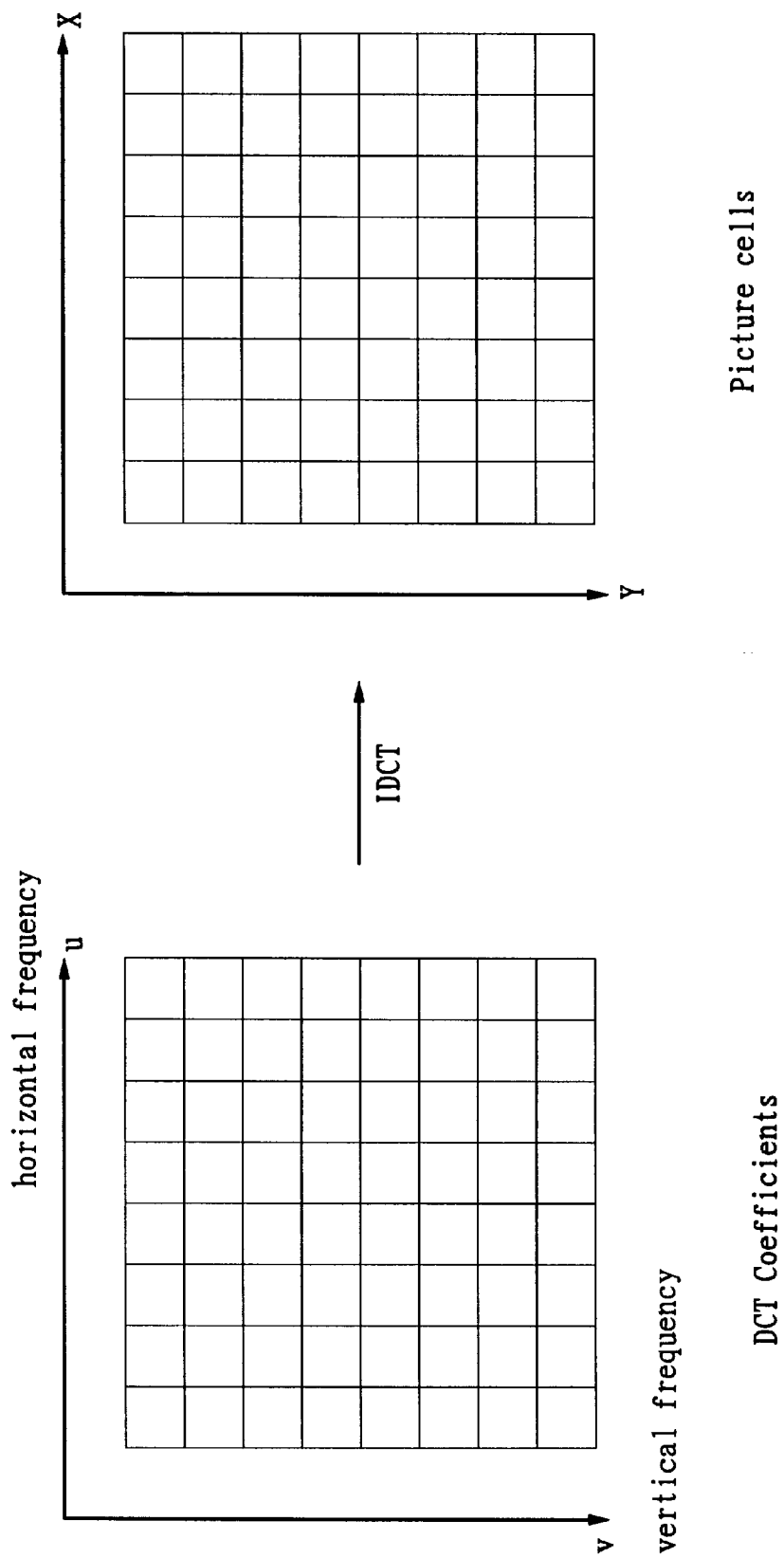
FIG. 1 is a view illustrating a 8×8 DCT coefficient block and a 8×8 pixel block.

FIG. 1 shows a 8×8 DCT coefficient block and a 8×8 pixel block. The one-dimensional IDCT is expressed in matrix form which is given by Mathematical Expression 3

[Y]=[C][X]

If we assume that $\Theta=\pi/16$, the mathematical expession 3 can be expressed in detail with respect to the 8×8 DCT coefficient $X_{ij}$ as follows Mathematical Expression 4

$$\begin{bmatrix} Y_0 \\ Y_1 \\ Y_2 \\ Y_3 \\ Y_4 \\ Y_5 \\ Y_6 \\ Y_7 \end{bmatrix} = \begin{bmatrix} \cos 4\theta & \cos \theta & \cos 2\theta & \cos 3\theta & \cos 4\theta & \cos 5\theta & \cos 6\theta & \cos 7\theta \\ \cos 4\theta & \cos 3\theta & \cos 6\theta & -\cos 7\theta & -\cos 4\theta & -\cos \theta & -\cos 2\theta & -\cos 5\theta \\ \cos 4\theta & \cos 5\theta & -\cos 6\theta & -\cos \theta & -\cos 4\theta & \cos 7\theta & \cos 2\theta & \cos 3\theta \\ \cos 4\theta & \cos 7\theta & -\cos 2\theta & -\cos 5\theta & \cos 4\theta & \cos 3\theta & -\cos 6\theta & -\cos \theta \\ \cos 4\theta & -\cos 7\theta & -\cos 2\theta & \cos 5\theta & \cos 4\theta & -\cos 3\theta & -\cos 6\theta & \cos \theta \\ \cos 4\theta & -\cos 5\theta & -\cos 6\theta & \cos \theta & -\cos 4\theta & -\cos 7\theta & \cos 2\theta & -\cos 3\theta \\ \cos 4\theta & -\cos 3\theta & \cos 6\theta & \cos 7\theta & -\cos 4\theta & \cos \theta & -\cos 2\theta & \cos 5\theta \\ \cos 4\theta & -\cos \theta & \cos 2\theta & -\cos 3\theta & \cos 4\theta & -\cos 5\theta & \cos 6\theta & -\cos 7\theta \end{bmatrix} \begin{bmatrix} X_0 \\ X_1 \\ X_2 \\ X_3 \\ X_4 \\ X_5 \\ X_6 \\ X_7 \end{bmatrix}.$$

According to the present invention, three improvements are proposed to perform two-dimensional IDCT by means of a 16-bit fixed-point processor.

First, in order to perform parallel processing of the two-dimensional IDCT by vector operations, the above mathematical expression 3 is converted to the following expression.

Mathematical Expression 5

$$[Y] = [C][X][C]^T$$
$$= [[C][[C][X]]^T]^T$$

According to the mathematical expression 5, performing the two-dimensional IDCT is possible by performing the one-dimensional IDCT-in a vertical direction, performing again the one-dimensional IDCT in the vertical direction with respect to the resultant as a transposed matrix, and then transposing the resultant. In other words, the IDCT can be performed only in one direction, i.e., in a vertical direction, and this enables full-parallel processing and full-vectorization. Specifically, if X of N×N is input, the one-dimensional IDCT is expressed by Mathematical Expression 6

$$Y_{ij} = \sum_{K=0}^{N-1} C_{ik} \times X_{kj} \quad (i, j = 0, 1, 2 \cdots, N-1)$$

Here, since X, Y, and C are scalar values, multiplication of $N^3$ times and additions of $N^2(N-1)$ times are required for performing the one-dimensional IDCT using the mathematical expression 6. However, if each column of the scalars $X_{ij}$ and $Y_{ij}$ are defined as the vector $\dot{X}_i=\{X_{i0}, X_{i1}, \ldots, X_{i(N-1)}\}$ and the vector $\dot{Y}_i=\{Y_{i0}, Y_{i1}, \ldots, Y_{i(N-1)}\}$, respectively, by applying the vector-parallel process according to the present invention, the above mathematical expression can be expressed as Mathematical Expression 7

$$\dot{Y}_i = \sum_{j=0}^{N-1} C_{ij} \times \dot{X}_j$$

Specifically, the values of $$C_{ij}\sqrt{\frac{2}{N}} \; C(i)\cos\left[\frac{(2j+1)\pi i}{2N}\right]$$

$$\left(C(i) = \frac{1}{\sqrt{2}}(i=0), C(i) = 1(i \neq 0)\right)$$

are stored in a scalar register, the values of $\dot{X}_i=\{X_{i0}, X_{i1}, \ldots, X_{i(n-1)}\}$ stored in a vector register, and then the calculation is performed using the mathematical expression 7. The same resultant corresponding to mathematical expression 6 can be obtained by scalar-vector multiplications of $N^2$ times and vector-vector additions of $N(N-1)$ times. As a result, according to the present invention, the two-dimensional IDCT is performed in one direction. This enables the full-vectorization, which allows the calculation of IDCT to be greatly reduced.

Second, the scalar-vector multiplications and the vector-vector additions are performed in such a manner that using the symmetry property of even columns of $$C_{ij} = \sqrt{\frac{2}{N}} \, C(i) \cos\left[\frac{(2j+1)\pi i}{2N}\right]\left(C(i) = \frac{1}{\sqrt{2}}(i=0), \, C(i) = 1(i \neq 0)\right)$$

as shown in the mathematical expression 4, the first to fourth rows are arranged as follows first row: $\dot{A}_1 = \cos 4\Theta \times (\dot{X}_0 + \dot{X}_4) + \cos 2\Theta \times \dot{X}_2 + \cos 6\Theta \times \dot{X}_6$
$\dot{A}_2 = \cos \Theta \times \dot{X}_1 + \cos 3\Theta \times \dot{X}_3 + \cos 5\Theta \times \dot{X}_5 + \cos 7\Theta \times \dot{X}_7$, second row: $\dot{B}_1 = \cos 4\Theta \times (\dot{X}_0 - \dot{X}_4) + \cos 6\Theta \times \dot{X}_2 - \cos 2\Theta \times \dot{X}_6$
$\dot{B}_2 = \cos 3\Theta \times \dot{X}_1 - \cos 7\Theta \times \dot{X}_3 - \cos \Theta \times \dot{X}_5 - \cos 5\Theta \times \dot{X}_7$, third row: $\dot{C}_1 = \cos 4\Theta \times (\dot{X}_0 - \dot{X}_4) - \cos 6\Theta \times \dot{X}_2 + \cos 2\Theta \times \dot{X}_6$
$\dot{C}_2 = \cos 5\Theta \times \dot{X}_1 - \cos \Theta \times \dot{X}_3 + \cos 7\Theta \times \dot{X}_5 + \cos 3\Theta \times \dot{X}_7$, fourth row: $\dot{D}_1 = \cos 4\Theta \times (\dot{X}_0 + \dot{X}_4) - \cos 2\Theta \times \dot{X}_2 - \cos 6\Theta \times \dot{X}_6$
$\dot{D}_2 = \cos 7\Theta \times \dot{X}_1 - \cos 5\Theta \times \dot{X}_3 + \cos 3\Theta \times \dot{X}_5 - \cos \Theta \times \dot{X}_7$, and the vector $\dot{Y}_i = \{Y_{i0}, Y_{i1}, \ldots, Y_{i(N-1)}\}$ is obtained by $\dot{Y}_0 = \dot{A}_1 + \dot{A}_2$,
$\dot{Y}_1 = \dot{B}_1 + \dot{B}_2$,
$\dot{Y}_2 = \dot{C}_1 + \dot{C}_2$,
$\dot{Y}_3 = \dot{D}_1 + \dot{D}_2$,
$\dot{Y}_4 = \dot{D}_1 - \dot{D}_2$,
$\dot{Y}_5 = \dot{C}_1 - \dot{C}_2$,
$\dot{Y}_6 = \dot{B}_1 - \dot{B}_2$,
$\dot{Y}_7 = \dot{A}_1 - \dot{A}_2$.

It is preferable that the values of $\dot{X}_0 + \dot{X}_4$ and $\dot{X}_0 - \dot{X}_4$ are obtained and calculated in advance. Using the symmetry as described above reduces the number of multiplications by $N^2/2$ times and the additions by $(N/2)(N-1)$ times, causing the amount of calculation to be decreased by half as compared with the calculation described with respect to mathematical equation 7.

Third, in order to perform additions and subtractions in 16 bit processor with respect to, which are 32 bit values obtained from 16 bit multiplications, the values must be changed to values of 16 bits with the decimal fractions cut away. Errors are generally accumulated in the subsequent second one-dimensional IDCT process which causes the bit accuracy required by international standards to go unsatisfied. The international standards determine the maximum limited value of the error caused between the result of the floating-point IDCT and the result of the fixed-point IDCT proposed by the present invention. According to the present invention, a dynamic range suitable for satisfying the international standards is determined.

Typically, in order to perform a floating-point operation by means of a fixed-point processor, the floating-point value is left-shifted for certain bits to be converted to an integer, a desired operation is performed with respect to the converted integer, and then the resultant is right-shifted to obtain a final resultant value by cutting away decimal fractions.

For example, to obtain the integer portion of the calculated resultant of 0.375×6, the following operation may be performed.

$$0.375 \times 6 = ((0.375 \ll 3) \times 6) \gg$$
$$= ((0.011_{(2)} \ll 3) \times 110_{(2)}) \gg 3$$
$$= (11_{(2)} \times 110_{(2)}) \gg 3$$
$$= 10010_{(2)} \gg 3$$
$$= 10_{(2)}$$
$$= 2$$

In the above operation, the term "<<3" represents a three-bit left shift, and ">>3" represents a three-bit right shift. If it is desired to round up the fractions during the above operation, it can be properly done before the right shift.

Specifically, the cosine value which is the floating-point value of the one-dimensional IDCT is first left-shifted for 15 bits to be an integer, and the resultant of 32 bits obtained by the calculation is right-shifted for 15 bits to obtain the desired resultant of 16 bits. Such calculation is repeated twice to perform the two-dimensional IDCT. In the conventional case, the fractions are cut away after the first IDCT process, and the errors accumulate after performing the second process. This causes the bit accuracy to deteriorate. As a result, a 32-bit processor is required to satisfy the desired bit accuracy, and this causes the cost of the IDCT apparatus to be increased. The present invention can solve the above-described problems by means of a 16-bit fixed-point processor.

Figure 2:
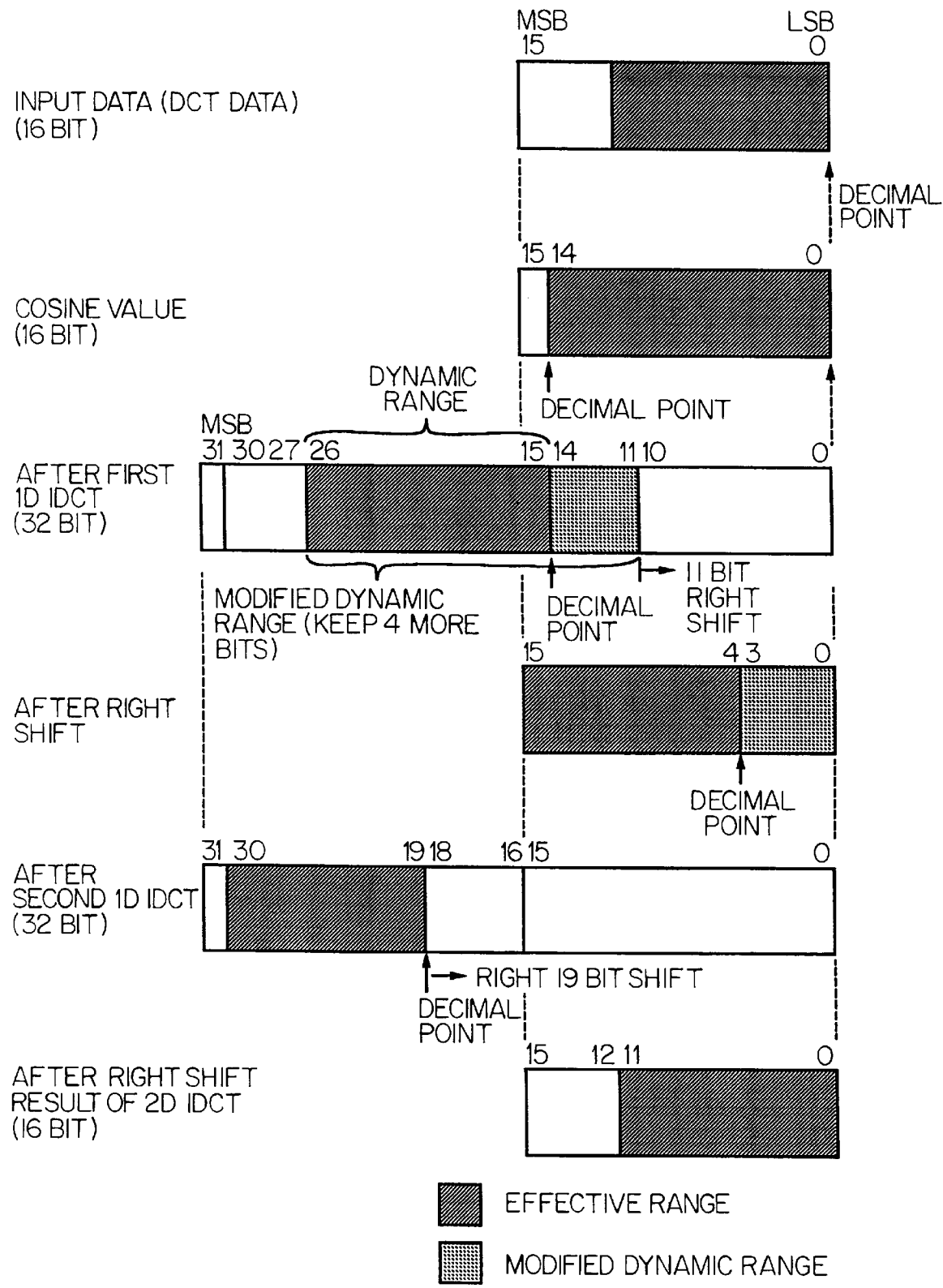
FIG. 2 is a view explaining the method of IDCT performed by a 16-bit fixed-point processor in accordance with the present invention.

Specifically, according to the present invention, as shown in FIG. 2, the one-dimensional IDCT value in the first direction is left-shifted for 11 bits and transferred to the one-dimensional IDCT section in the second direction. The one-dimensional IDCT value in the second direction is right-shifted for 19 bits to obtain the final two-dimensional IDCT value. The maximum value resulting from the one-dimensional IDCT of DCT data does not exceed 12 bits according to the characteristics of the IDCT coefficient, and thus the upper four bits of the 16 bits have no meaning. Accordingly, maintaining four bits for the decimal fractions instead of the upper four bits reduces the error generated in the two-dimensional IDCT.

From the foregoing, it will be apparent that the present invention provides advantages in that it can substantially reduce the amount of calculation while satisfying the bit accuracy of international standards and thus decrease the cost of the IDCT processing apparatus. The present invention performs parallel processing by full-vectorization and using the symmetry of the cosine matrix to perform the two-dimensional IDCT by means of a 16-bit fixed-point processor.

While the present invention has been described and illustrated herein with reference to a preferred embodiment thereof, it will be understood by those skilled in the art that various changes in form and details may be made therein without departing from the spirit and scope of the invention.

What is claimed is:

1. A method of performing IDCT on an image signal compressed using a discrete cosine transform comprising the steps of:

defining each column of scalars $X_{ij}$ (where, $i,j=0,1,2,\ldots,N-1$) and $Y_{ij}$ as a vector $\dot{X}_i = \{X_{i0}, X_{i1}, \ldots, X_{i(N-1)}\}$ and a vector $\dot{Y}_i = \{Y_{i0}, Y_{i1}, \ldots, Y_{i(N-1)}\}$, respectively;

storing values of $$C_{ij} = \sqrt{\frac{2}{N}} C(i) \cos\left[\frac{(2j+1)\pi i}{2N}\right]$$

in a scalar register;

storing values of $\dot{X}_i = \{X_{i0}, X_{i1}, \ldots, X_{i(N-1)}\}$ in a vector register;

obtaining $\dot{Y}_i = \{Y_{i0}, Y_{i1}, \ldots, Y_{i(N-1)}\}$ by reading out the values stored in the scalar register and the vector register and by parallel-processing scalar-vector multiplications and vector-vector additions with respect to the readout scalar values and vector values according to the equation $$\dot{Y}_i = \sum_{j=0}^{N-1} C_{ij} \times \dot{X}_j;$$

obtaining values of a one-dimensional IDCT in a first direction by performing the one-dimensional IDCT in the first direction by repeatedly performing the above described steps N times;

obtaining a transposed matrix of the obtained one-dimensional IDCT values in the first direction; and obtaining values of a final two-dimensional IDCT by obtaining values of the transposed matrix in the same manner as the one-dimensional IDCT in the first direction and by obtaining a transposed matrix of the obtained values to perform a one-dimensional IDCT in a second direction, wherein said values of the final two-dimensional matrix correspond to data for a decompressed image signal.

2. A method of performing IDCT as claimed in claim 1, wherein the scalar-vector multiplications and the vector-vector additions are performed in such a manner that using the symmetry of even columns of $$\left[C_{ij} = \sqrt{\frac{2}{N}} C(i) \cos\left[\frac{(2j+1)\pi i}{2N}\right]\right]$$

$$\left(C(i) = \frac{1}{\sqrt{2}} (i=0), C(i) = 1 (i \neq 0)\right) C_{ij} =$$

$$\sqrt{\frac{2}{N}} C(i) \cos\left[\frac{(2j+1)\pi i}{2N}\right] \left(C(i) = \frac{1}{\sqrt{2}} (i=0), C(i) = 1 (i \neq 0)\right),$$

the first to fourth rows are arranged as follows first row: $\dot{A}_1 = \cos 4\Theta x(\dot{X}_0 + \dot{X}_4) + \cos 2\Theta x\dot{X}_2 + \cos 6\Theta x\dot{X}_6$
$\dot{A}_2 = \cos \Theta x\dot{X}_1 + \cos 3\Theta x\dot{X}_3 + \cos 5\Theta \dot{X}_5 + \cos 7\Theta x\dot{X}_7$, second row: $\dot{B}_1 = \cos 4\Theta x(\dot{X}_0 - \dot{X}_4) + \cos 6\Theta x\dot{X}_2 - \cos 2\Theta x\dot{X}_6$
$\dot{B}_2 = \cos 3\Theta x\dot{X}_1 - \cos 7\Theta \dot{X}_3 - \cos \Theta x\dot{X}_5 - \cos 5\Theta x\dot{X}_7$, third row: $\dot{C}_1 = \cos 4\Theta x(\dot{X}_0 - \dot{X}_4) - \cos 6\Theta x\dot{X}_2 + \cos 2\Theta x\dot{X}_6$
$\dot{C}_2 = \cos 5\Theta x\dot{X}_1 - \cos \Theta x\dot{X}_3 + \cos 7\Theta x\dot{X}_5 + \cos 3\Theta x\dot{X}_7$, fourth row: $\dot{D}_1 = \cos 4\Theta x(\dot{X}_{0+\dot{X}4}) - \cos 2\Theta x\dot{X}_2 - \cos 6\Theta x\dot{X}_6$
$\dot{D}_2 = \cos 7\Theta x\dot{X}_1 - \cos 5\Theta x\dot{X}_3 + \cos 3\Theta x\dot{X}_5 - \cos \Theta x\dot{X}_7$, and the vector $\dot{Y}_i = \{Y_{i0}, Y_{i1}, \ldots, Y_{i(N-1)}\}$ is obtained by calculating $\dot{Y}_0 = \dot{A}_1 + \dot{A}_2$, $\dot{Y}_1 = \dot{B}_1 + \dot{B}_2$, $\dot{Y}_2 = \dot{C}_1 + \dot{C}_2$, $\dot{Y}_3 = \dot{D}_1 + \dot{D}_2$, $\dot{Y}_4 = \dot{D}_1 - \dot{D}_2$, $\dot{Y}_5 = \dot{C}_1 - \dot{C}_2$, $\dot{Y}_6 = \dot{B}_1 - \dot{B}_2$, $\dot{Y}_7 = \dot{A}_1 - \dot{A}_2$, respectively.

3. A method of performing IDCT as claimed in claim 2, wherein the values of $\dot{X}_0 + \dot{X}_4$ and $\dot{X}_0 - \dot{X}_4$ are obtained and calculated in advance.

4. A method of performing IDCT as claimed in claim 3, wherein the multiplication and the addition are performed by means of a 16-bit fixed-point type processor in such a manner that the obtained one-dimensional IDCT value in the first direction is left-shifted for 11 bits and transferred to a one-dimensional IDCT section in the second direction, and the obtained one-dimensional IDCT value in the second direction is right-shifted for 19 bits to obtain a final two-dimensional IDCT value.

* * * * *